United States Patent
Bhattacharya et al.

(10) Patent No.: US 12,238,451 B2
(45) Date of Patent: Feb. 25, 2025

(54) PREDICTING VIDEO EDITS FROM TEXT-BASED CONVERSATIONS USING NEURAL NETWORKS

(71) Applicant: Adobe Inc., San Jose, CA (US)

(72) Inventors: Uttaran Bhattacharya, Sunnyvale, CA (US); Gang Wu, San Jose, CA (US); Viswanathan Swaminathan, Saratoga, CA (US); Stefano Petrangeli, Mountain View, CA (US)

(73) Assignee: Adobe Inc., San Jose, CA (US)

( * ) Notice: Subject to any disclaimer, the term of this patent is extended or adjusted under 35 U.S.C. 154(b) by 71 days.

(21) Appl. No.: 18/055,301

(22) Filed: Nov. 14, 2022

(65) Prior Publication Data
US 2024/0163393 A1 May 16, 2024

(51) Int. Cl.
*H04N 7/00* (2011.01)
*G06T 11/60* (2006.01)

(52) U.S. Cl.
CPC ............. *H04N 7/002* (2013.01); *G06T 11/60* (2013.01)

(58) Field of Classification Search
CPC ................................ H04N 7/002; G06T 11/60
See application file for complete search history.

(56) References Cited

U.S. PATENT DOCUMENTS

| | | | |
|---|---|---|---|
| 11,138,693 B2 | 10/2021 | Mejjati et al. | |
| 11,170,389 B2 | 11/2021 | Wang et al. | |
| 11,574,477 B2 | 2/2023 | Wu et al. | |
| 2022/0130077 A1* | 4/2022 | Rajarathnam | G06F 3/011 |
| 2023/0196817 A1 | 6/2023 | Oh et al. | |
| 2023/0260502 A1* | 8/2023 | Gabrys | G10L 19/16 |
| | | | 704/260 |
| 2023/0376690 A1* | 11/2023 | Bellegarda | G06N 3/045 |

OTHER PUBLICATIONS

Bau, D. et al., "Semantic Photo Manipulation with a Generative Image Prior," ACM Trans. Graph. 38, 4, Article 59, Aug. 2019, pp. 59:1-59:11.

Bhattacharya, U. et al., "HighlightMe: Detecting Highlights From Human-Centric Videos," Proceedings of the IEEE/CVF International Conference on Computer Vision (ICCV), Oct. 2021, pp. 8157-8167.

(Continued)

*Primary Examiner* — Mishawn N. Hunter
(74) *Attorney, Agent, or Firm* — Nicholson De Vos Webster & Elliott LLP

(57) ABSTRACT

Embodiments are disclosed for predicting, using neural networks, editing operations for application to a video sequence based on processing conversational messages by a video editing system. In particular, in one or more embodiments, the disclosed systems and methods comprise receiving an input including a video sequence and text sentences, the text sentences describing a modification to the video sequence, mapping, by a first neural network content of the text sentences describing the modification to the video sequence to a candidate editing operation, processing, by a second neural network, the video sequence to predict parameter values for the candidate editing operation, and generating a modified video sequence by applying the candidate editing operation with the predicted parameter values to the video sequence.

20 Claims, 9 Drawing Sheets

(56) References Cited

OTHER PUBLICATIONS

Bhattacharya, U. et al., "Show Me What I Like: Detecting User-Specific Video Highlights Using Content-Based Multi-Head Attention," MM '22: Proceedings of the 30th ACM International Conference on Multimedia, Oct. 2022, pp. 591-600.

Carreira, J. et al., "Quo Vadis, Action Recognition? A New Model and the Kinetics Dataset", arXiv:1705.07750v1 [cs.CV], May 22, 2017, 10 pages.

Castellano, B., "scenedetect 0.6.3: pip install scenedetect," https://pypi.org/project/scenedetect/, retrieved on Mar. 14, 2024, 5 pages.

Fu, T.-J., et al., "M3L: Language-based Video Editing via Multi-Modal Multi-Level Transformers," arXiv:2104.01122 [cs.CV], Apr. 2021, pp. 1-12.

Hasler, D. et al., "Measuring Colorfulness in Natural Images," Proceedings of SPIE—The International Society for Optical Engineering 5007, Jun. 2003, pp. 87-95.

Heo, M. et al., "VITA: Video Instance Segmentation via Object Token Association," 36th Conference on Neural Information Processing Systems (NeurIPS 2022)., arXiv:2206.04403v2 [cs.CV], Oct. 2022, pp. 1-14.

Hwang, S. et al., "Video Instance Segmentation using Inter-Frame Communication Transformers," 35th Conference on Neural Information Processing Systems (NeurIPS 2021), Dec. 2021, pp. 1-12.

Leake, M. et al., "Computational Video Editing for Dialogue-Driven Scenes," ACM Transactions on Graphics, vol. 36, No. 4, Article 130, Jul. 2017, pp. 130:1-130: 14.

Liu, J. et al., "Violin: A Large-Scale Dataset for Video-and-Language Inference," 2020 IEEE/CVF Conference on Computer Vision and Pattern Recognition (CVPR), Jun. 2020, p. 10897-10907.

Liu, X. et al., "Learning to Predict Layout-to-image Conditional Convolutions for Semantic Image Synthesis," 33rd Conference on Neural Information Processing Systems (NeurIPS 2019), Oct. 2019, pp. 1-11.

Liu, X. et al., "Open-Edit: Open-Domain Image Manipulation With Open-Vocabulary Instructions<" Computer Vision-ECCV 2020: 16th European Conference, Proceedings, Part XI 16, Aug. 23-28, 2020, pp. 1-17.

Mejjati, Y.A. et al., "Look here! A parametric learning based approach to redirect visual attention," Computer Vision—ECCV 2020, 16th European Conference, Proceedings, Part XXIII, Aug. 23-28, 2020, pp. 1-16.

NASA Ames Research Center, "Luminance Contrast," https://colorusage.arc.nasa.gov/luminance_cont.php, retrieved on Mar. 14, 2024, 5 pages.

Reimers, N., "SentenceTransformers Documentation," www.sbert.net, retrieved on Mar. 14, 2024, pp. 1-8.

Smith, J., "Calculating Color Temperature and Illuminance using the Taos TCS3414CS Digital Color Sensor," Intelligent Opto Sensor Designer's Notebook, No. 25, Feb. 2009, pp. 1-7.

Tong, H. et al., "Blur Detection for Digital Images Using Wavelet Transform," 2004 IEEE International Conference on Multimedia and Expo (ICME) (IEEE Cat. No.04TH8763), 2004, pp. 17-20.

W3C, "Techniques For Accessibility Evaluation And Repair Tools: W3C Working Draft," https://www.w3.org/TR/2000/WD-AERT-20000426, Apr. 26, 2000, 58 pages.

Wang, Z. et al., "Image Quality Assessment: From Error Visibility to Structural Similarity," IEEE Transactions on Image Processing, vol. 13, No. 4, Apr. 2004, pp. 600-612.

Xu, R. et al., "Closing-the-Loop: A Data-Driven Framework for Effective Video Summarization," 2020 IEEE International Symposium on Multimedia (ISM), Dec. 2020, pp. 1-8.

Xu, W. et al., "Symmetric Regularization based BERT for Pair-wise Semantic Reasoning," arXiv:1909.03405v3 [cs.CL], Jun. 17, 2021, pp. 1-8.

Zhang, Z. et al., "Semantics-Aware BERT for Language Understanding," Proceedings of the AAAI Conference on Artificial Intelligence, vol. 34, No. 05, Apr. 2020, pp. 9628-9635.

\* cited by examiner

PREDICTING VIDEO EDITS FROM TEXT-BASED CONVERSATIONS USING NEURAL NETWORKS

BACKGROUND

The editing process is an important component of media creation to create refined media that engage with a target audience. The editing process for a video can include making changes to a plurality of different visual elements, including brightness, contrast, colorfulness, temperature, etc., as well as to a duration of the video by removing or trimming portions of the video. However, the editing process usually requires domain knowledge of the video content and technical skills operating editing software, and even then, can be a time-consuming process requiring significant manual adjustments of the various visual elements. While some solutions have attempted to streamline the editing process, these solutions have limitations and drawbacks.

SUMMARY

Introduced here are techniques/technologies that allow a video editing system to determine the type of intended editing operations for a video sequence based on processing live conversational messages in accordance with one or more embodiments. The video editing system identifies candidate editing operations and based on analyzing the video sequence, predicts the optimal parameters for editing operations that satisfy the intent of the user as determined from the conversational messages. The editing operations with the predicted optimal parameters can then be presented to users. The process can be repeated as subsequent conversational messages are received and analyzed.

In particular, in one or more embodiments, a video editing system can receive a video sequence and messages as an input. The messages can include conversational messages from two or more concurrent users provided in user interactions with the video editing system or from an external messaging system, where the conversational messages discuss modifications to visual elements of the video sequence (e.g., brightness, colorfulness, etc.). The video editing system then uses a first neural network (e.g., a sentence transformer) to map content of the conversational messages describing the modifications to the video sequence to a candidate editing operation. The video editing system then uses a second neural network to process the video sequence to predict parameter values for the candidate editing operation. The video editing system then generates a modified video sequence by applying the candidate editing operation with the predicted parameter values to the video sequence.

In some embodiments, where the video editing system receives a video sequence without any corresponding conversational messages, the video editing system can predict the combinatorically optimal parameters for one or more available editing operations and apply them to the input video sequence.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

Figure 1:
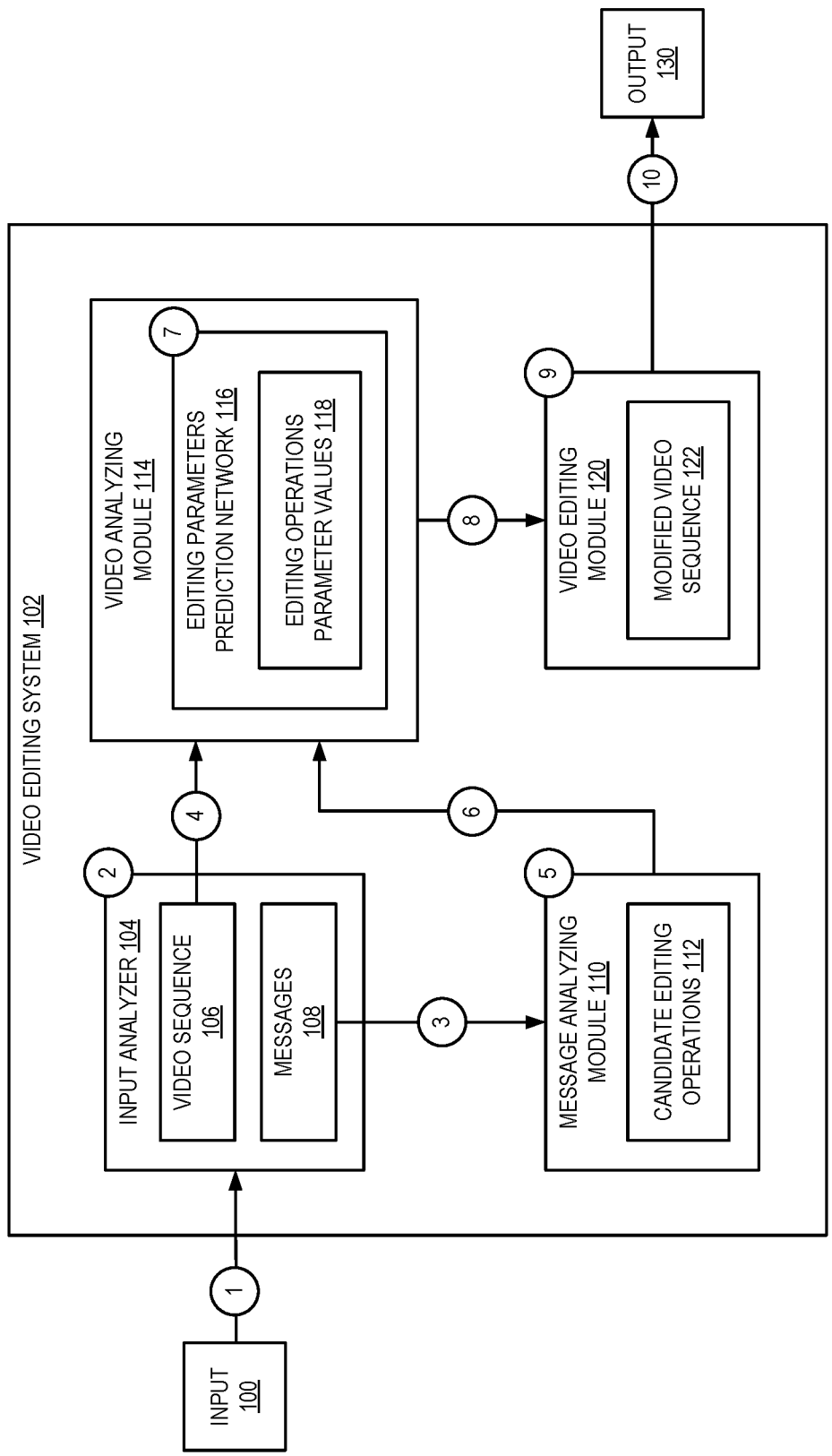
FIG. 1 illustrates a diagram of a process of using machine learning models to predict editing operations for a video sequence based on processing conversational messages in accordance with one or more embodiments.

One or more embodiments of the present disclosure include a video editing system that uses trained neural network to predict optimal parameter values for one or more editing operations for a video sequence based on the video content, which can be further fine-tuned as necessary by processing conversational messages between two or more users describing modifications to the video sequence. The neural networks include a sentence transformer trained to generate feature vectors for the conversational messages and a prediction network to predict the parameter values for one or more editing operations for a video sequence based on generating feature vectors representing frames of the video sequence.

Some existing solutions use textual descriptions to either specify edits for static images or make predefined edits to videos from known domains. For example, some solutions perform manipulations on the latent representations of images used text-based instructions. These solutions compute a common latent space for the image and the text-based instructions, such that the latent representations of images can be algebraically modified by the latent representations of the text-based instructions in the same space. However, solutions that performs edits to static images cannot be scaled to video sequences as they have high computational overhead, such that as applying these solutions to the significant number of image frames in a video sequence would be time and resource-intensive. Further, current solutions that perform edit operations based on textual descriptions require the text-based instructions to explicitly describe a requested editing operation. These solutions do not work with conversational messages between users which generally do not contain explicit textual descriptions of edit operations.

Other existing solutions use data related to how videos are consumed on a social media platform by a particular audience and how similar videos were edited in the past to predict the optimal portion and length of a target video that would be more effective for the particular audience. These solutions identify the moments of interest from a video or distills the video into its key events. However, they are based on video understanding only, without any text component. Another limitation of existing video editing systems is that they cannot automate the video editing process with support for collaboration across users.

To address these issues, after receiving an input video sequence and conversational messages discussing modifications to the video sequence, the video editing system analyzes the conversational messages to determine candidate editing operations. To determine candidate editing operations from the conversational messages, the video editing system uses sentence transformers to generate message feature vectors. The message feature vectors are compared to reference feature vectors for reference sentences associated with editing operations, where the editing operation associated with the reference feature vector most similar to a message feature vector is identified as a candidate editing operation. The video editing system can then use neural networks to analyze the video sequence to predict optimal parameter values for the candidate editing operations. The video editing system can then generate a modified video sequence by applying the predicted optimal parameter values for the candidate editing operations to the input video sequence.

By predicting editing operations and parameter values for predicted editing operations to apply to a video sequence, based on processing conversational messages, the embodiments described herein provide a significant increase in editing speed and scalability. For example, the video editing system described herein reduces the latency involved in the iterations between discussions of edit operations and the application of those edit operations. Further, unlike existing solutions that require explicit text instructions describing specific editing operations, the embodiments described herein can receive text-based conversations that discuss potential edits without explicit instructions. For example, a user may mention in a text-based conversation that an image or a video could be made brighter (indicating a brightness increase operation) without explicitly describing the necessary operation. Further training an editing parameters prediction network to efficiently determine optimal parameter values for candidate editing operations based on a mapping between user messages and references allows reduces the time and resources that would otherwise be used to determine optimal parameters values through a manual process.

FIG. 1 illustrates a diagram of a process of using machine learning models to predict editing operations for a video sequence based on processing conversational messages in accordance with one or more embodiments. As shown in FIG. 1, a video editing system 102 receives an input 100, as shown at numeral 1. For example, the video editing system 102 receives the input 100 from a user via a computing device or from a memory or storage location. In one or more embodiments, the input 100 includes a video sequence 106 and messages 108. While a single input 100 is shown in FIG. 1, the video editing system 102 can receive the video sequence 106 and the messages 108 in separate inputs. The messages 108 can include conversational messages from a plurality of users collaborating on the editing of the video sequence 106. In one or more embodiments, the messages 108 can be received in real-time (e.g., as they are received as inputs to the video editing system 102).

As illustrated in FIG. 1, the video editing system 102 includes an input analyzer 104 that receives the input 100.

In some embodiments, the input analyzer 104 analyzes the input 100, at numeral 2. In one or more embodiments, the input analyzer 104 analyzes the input 100 to identify the video sequence 106 and the messages 108. In one or more embodiments, the input analyzer 104 further includes a shot detector that extracts the constituent shots of the video sequence 106, where each shot includes a plurality of frames. In one or more embodiments, the video sequence 106 is segments into shots, as each shot (e.g., sequence of frames) typically includes well-defined subject matters that assist in predicting the editing parameters. After the input analyzer 104 analyzes the input 100, the messages 108 are sent to message analyzing module 110, as shown at numeral 3, and the video sequence 106 is to video analyzing module 110, as shown at numeral 4. In one or more other embodiments, the input analyzer 104 optionally stores the video sequence 106 and the messages 108 in a memory or storage location for later access, as shown.

In one or more embodiments, the message analyzing module 110 is configured to determine candidate editing operations 112 by performing a semantic understanding process, at numeral 5. Example sentences in the messages 108 include, "Let's trim the last two seconds," "The contrast seems too high," "How about making the shot warmer," and "Can we increase the brightness?" In one or more embodiments, the semantic understanding process determines user intent by mapping the messages 108 to possible editing operations to determine the candidate editing operations 112. In some embodiments, the possible editing operations include changing brightness, contrast, blurriness, colorfulness, and temperature. Possible editing operations can further include trimming the length of the video sequence 106.

Figure 2:
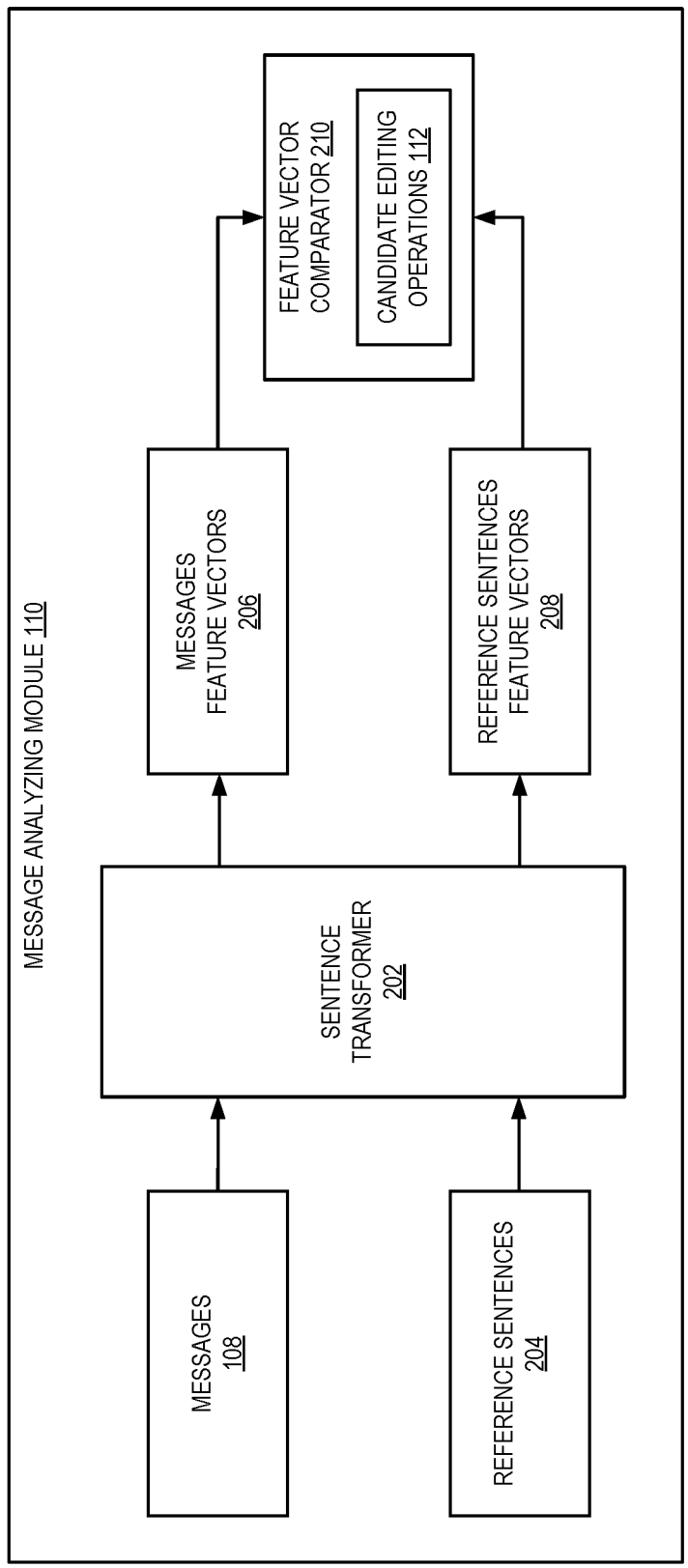
FIG. 2 illustrates an example message analyzing module for performing a semantic understanding process in accordance with one or more embodiments.

FIG. 2 illustrates an example message analyzing module for performing a semantic understanding process in accordance with one or more embodiments. As depicted in FIG. 2, the messages 108 are passed through sentence transformer 202 to generate messages feature vectors 206.

The message analyzing module 110 also retrieves reference sentences 204, e.g., from a memory or storage location. Each of the reference sentences 204 can be associated or mapped to one of the possible editing operations. For example, reference sentences "change contrast," "adjust brightness," "change sharpness," can be mapped to contrast, brightness, and blurriness editing operations, respectively. In one or more embodiments, the reference sentences 204 are also passed through sentence transformer 202 to generated reference sentences feature vectors 208. In other embodiments, the reference sentences feature vectors 208 can be previously generated by the sentence transformer 202 and stored for later retrieval.

In one or more embodiments, the sentence transformer 202 is a trained BERT-based sentence transformer. In some embodiments, given a list of N reference sentences 204, $r_1$, $r_2$, ..., $r_N$, the sentence transformer 202 generates corresponding multi-dimensional latent feature vectors, $f_{r_1}$, $f_{r_2}$, ..., $f_{r_N}$, (e.g., reference sentences feature vectors 208). Similarly, the sentence transformer 202 generates a multi-dimensional latent feature vector, $f_s$, given sentence, s, in messages 108. In some embodiments, the messages 108 may include multiple sentences with multiple intents (e.g., multiple sentences indicating multiple editing operations). When the messages 108 include multiple sentences, a separate message feature vector is generated for each sentence of the multiple sentences, resulting in messages feature vectors 206.

The messages feature vectors 206 and the reference sentences feature vectors 208 are then passed to a feature vector comparator 210 to calculate the cosine similarity between each message feature vector in the messages feature vectors 206 and the reference sentences feature vectors 208. In one or more embodiments, the feature vector comparator 210 determines the reference sentence, r*, that is closest in meaning to sentence, s, in messages 108, using the messages feature vectors 206 and the reference sentences feature vectors 208, as follows:

$$r^* = \underset{r_i \in \{r_1, \ldots, r_N\}}{\operatorname{argmax}} \cos \frac{r_i \cdot s}{\|r_i\| \|s\|}$$

In one or more embodiments, where the cosine similarity value of r* is above a threshold value, the user intent is determined to be the editing operation mapped to the corresponding reference sentence, which is identified as a candidate editing operation. In one or more embodiments, where there are multiple sentences with multiple intents, there may be multiple editing operations identified (e.g., an r* for each sentence) as the candidate editing operations 112.

Returning to FIG. 1, after determining the candidate editing operations 112, the message analyzing module 110 sends the candidate editing operations 112 to the video analyzing module 114, as shown at numeral 6. In one or more embodiments, the video analyzing module 114 processes the video sequence 106 to predict optimal parameters for one or more editing operations indicated by the candidate editing operations 112, at numeral 7. In other embodiments, the video analyzing module 114 predicts optimal parameters for additional or all editing operations in addition to the one or more editing operations indicated by the candidate editing operations 112.

Figure 3:
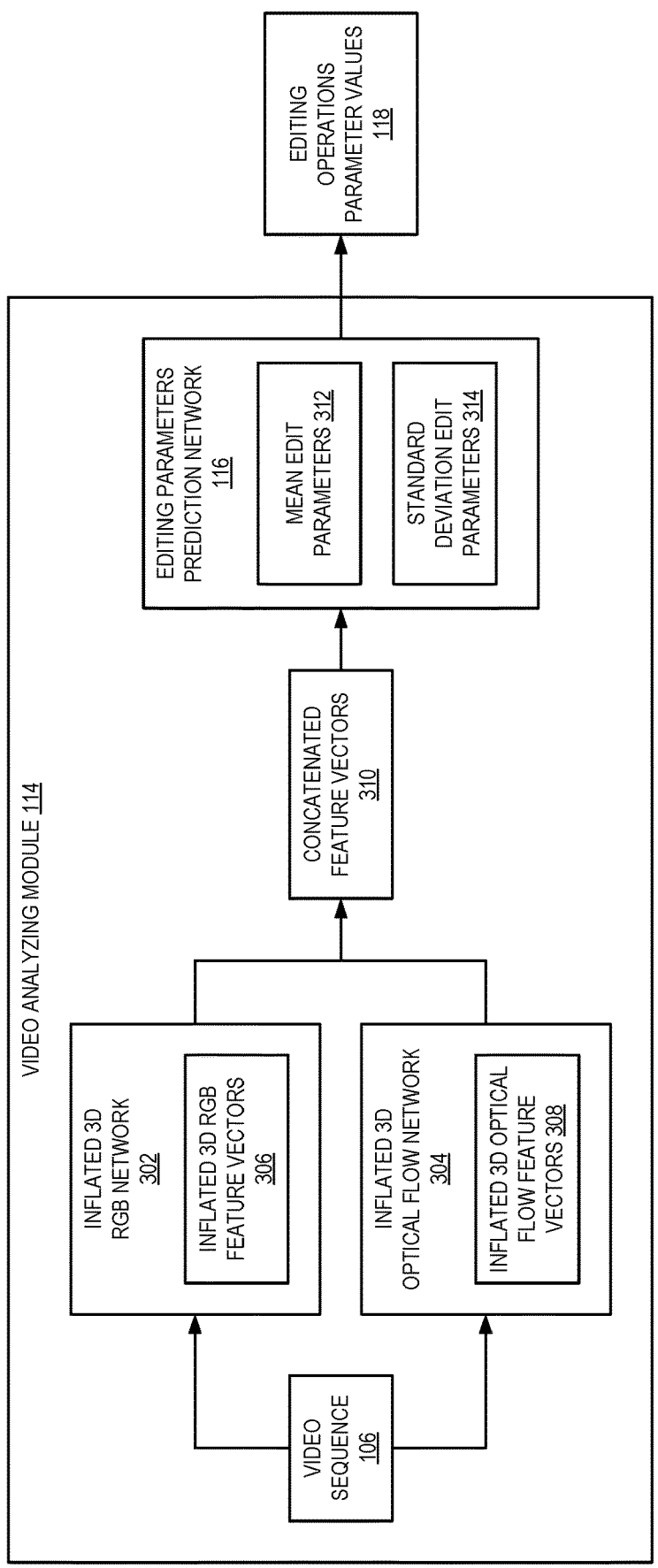
FIG. 3 illustrates an example video analyzing module for predicting parameters for editing operations for a video sequence in accordance with one or more embodiments.
Figure 4:
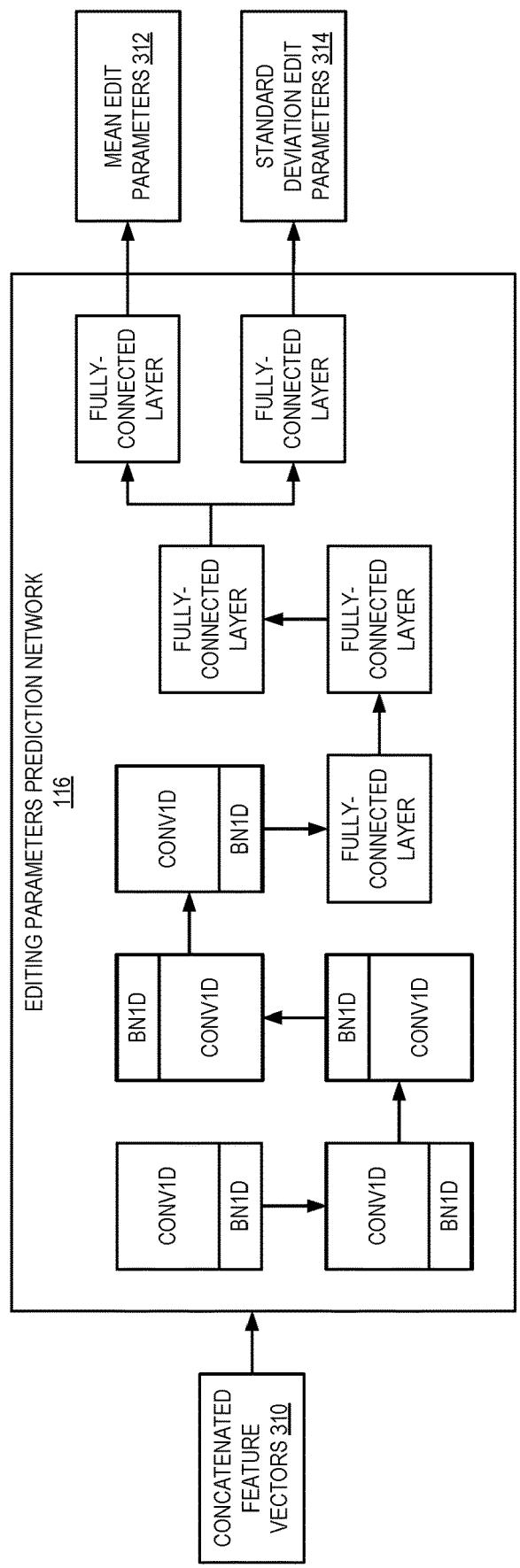
FIG. 4 illustrates an example editing parameters prediction network in accordance with one or more embodiments.

FIG. 3 illustrates an example video analyzing module for predicting parameters for editing operations for a video sequence in accordance with one or more embodiments. As depicted in FIG. 3, the video sequence 106 (e.g., the constituent shots of the video sequence 106) are passed through pre-trained inflated 3D neural network to predict 1024-dimensional latent feature vectors. In one or more embodiments, the pre-trained inflated 3D neural network is tuned to perform action recognition. In one or more embodiments, the video sequence 106 is passed through an inflated 3D RGB network 302 to produce an inflated 3D RGB feature vector 306, $i_{RGB}$, based on the RGB content per frame of the video sequence 106. The inflated 3D RGB feature vector captures the shapes and positions of the constituent humans and objects detected per frame of the video sequence 106. The video sequence 106 is also passed through an inflated 3D optical flow network 304 to produce an inflated 3D optical flow feature vector 308, $i_{flow}$, based on the optical flow between consecutive pairs of frames. The inflated 3D optical flow feature vector captures the temporal movements of the humans and the objects across the frames of the sequence 106. Although depicted as separate neural networks, the inflated 3D RGB network 302 and the inflated 3D optical flow network 304 can be a single module. The inflated 3D RGB feature vector 306 and the inflated 3D optical flow feature vector 308 are then concatenated to create concatenated feature vectors 310. The concatenated feature vectors 310 is then passed through an editing parameters prediction network 116. FIG. 4 illustrates an example editing parameters prediction network in accordance with one or more embodiments. In one or more embodiments, the editing parameters prediction network 116 includes a series of five one-dimensional convolutional neural networks (CNNs), each followed by a batch normalization. Following the final batch normalization, the concatenated feature vectors 310 are passed through three fully-connected layers. The output of the three fully-connected layers is passed to two final fully-connected layers. A first fully-connected layer predicts the mean edit parameters 312 and a second fully-connected layer predicts the standard deviation edit parameters 314 of the one or more candidate editing operations 112 across all of the frames in a shot.

Returning to FIG. 1, after generating the mean edit parameters 312 and the standard deviation edit parameters 314, the mean edit parameters 312 and the standard deviation edit parameters 314 are sent as editing operations parameter values 118 to a video editing module 120, as shown at numeral 8. In one or more embodiments, the video editing module 120 generates a modified video sequence 122 by applying the predicted editing operations parameter values 118 for the candidate editing operation to the video sequence 106, at numeral 9. In some embodiments, the video editing module 122 can automatically apply the mean value (s) to the video sequence 106 to produce the modified video sequence 122. In other embodiments, the video editing module 120 generates a graphical user interface indicating the candidate editing operation and a range of values based on the predicted editing operations parameter values 118 for the candidate editing operation. The graphical user interface can further indicate suggested parameters values within the range of values. The graphical user interface can include an interface element (e.g., an adjustable dial) that allows a user to adjust the parameters for the candidate editing operation. In one or more embodiments, the system recommends each candidate editing operation and the corresponding range of values, and based on users' responses, can reject, modify, or accept the candidate editing operations.

In one or more embodiments, the video editing system 102 provides an output 130, including the modified video sequence 122, or alternatively, the graphical user interface indicating the candidate editing operation and a range of values, as shown at numeral 10. In one or more embodiments, after the process described above in numerals 1-9 the output 130 is sent to the user or computing device that initiated the video editing process with the video editing system 102, to another computing device associated with the user or another user, or to another system or application. For example, after the process described above in numerals 1-10, the modified video sequence 122 can be displayed in a user interface of a computing device.

In one or more embodiments, the process described above in numerals 1-10 is repeated as subsequent additional conversational messages are received as inputs by the video editing system 102. For example, the process can be repeated until all candidate editing operations 112 generated based on the messages 108 have been handled by the video editing system 102.

Figure 5:
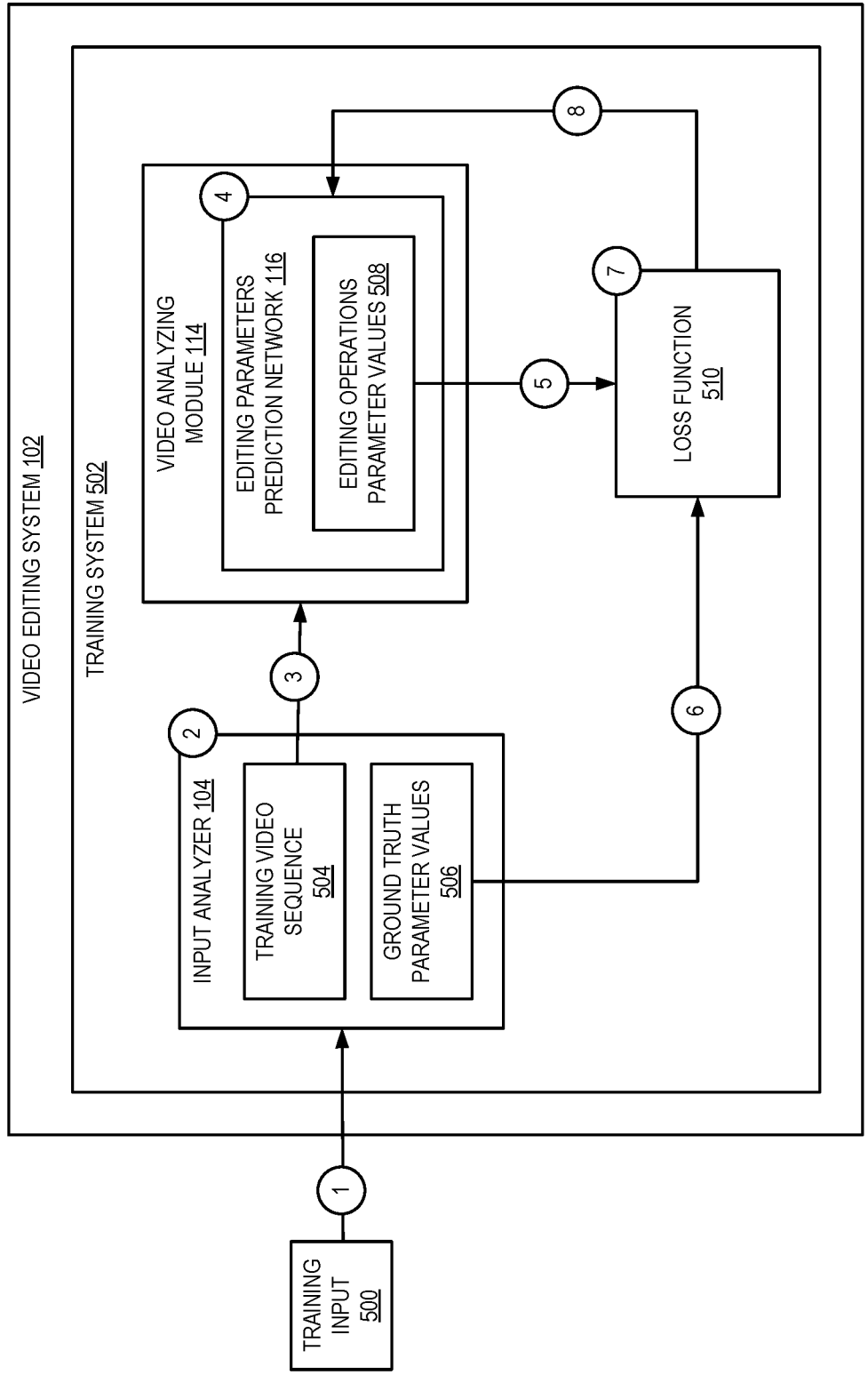
FIG. 5 illustrates a diagram of a process of training a machine learning model to predict parameter values for editing operations for a video sequence in accordance with one or more embodiments.

FIG. 5 illustrates a diagram of a process of training a machine learning model to predict parameter values for editing operations for a video sequence in accordance with one or more embodiments. In one or more embodiments, a training system 502 is configured to train a neural network (e.g., editing parameters prediction network 116) to predict parameter values for editing operations for a video sequence based on training inputs. In some embodiments, the training system 502 is a part of a video editing system 102. In other embodiments, the training system 502 can be a standalone system, or part of another system, and deployed to the video editing system 102. For example, the training system 502 may be implemented as a separate system implemented on electronic devices separate from the electronic devices implementing video editing system 102. As shown in FIG. 1, the training system 502 receives a training input 500, as shown at numeral 1. For example, the video editing system 102 receives the training input 500 from a user via a computing device or from a memory or storage location. In one or more embodiments, the training input 500 includes at least a training video sequence 504. The training input 500 can include multiple training video sequences that can be fed to the training system 502 in parallel or in series.

As illustrated in FIG. 5, the video editing system 102 includes an input analyzer 104 that receives the training input 500. In some embodiments, the input analyzer 104 analyzes the training input 500, at numeral 2. In one or more embodiments, the input analyzer 104 analyzes the training input 500 to identify the training video sequence 504. In one or more embodiments, the input analyzer 104 includes a shot detector that extracts the constituent shots of the training video sequence 504, where each shot includes a plurality of frames. In one or more embodiments, the input analyzer 104 further generates ground truth values for blurriness (be), colorfulness (cl), contrast (cn), luminance/brightness (lm), and temperature (tm) for each frame in a shot of training video sequence 504. The ground truth mean and the ground truth standard deviation of the parameters are then computed across all the frames in each shot, as follows:

$$\mu^{calc} = (\mu_{be}^{calc}, \mu_{cl}^{calc}, \mu_{cn}^{calc}, \mu_{lm}^{calc}, \mu_{tm}^{calc})$$

$$\sigma^{calc} = (\sigma_{be}^{calc}, \sigma_{cl}^{calc}, \sigma_{cn}^{calc}, \sigma_{lm}^{calc}, \sigma_{tm}^{calc})$$

After the input analyzer 104 analyzes the training input 500, the training video sequence 504 is sent to video analyzing module 110, as shown at numeral 3. In one or more embodiments, the video analyzing module 114 processes the training video sequence 504 to predict optimal parameters for one or more editing operations, at numeral 4. For example, the one or more editing operations can include blurriness, colorfulness, contrast, luminance/brightness, and temperature. In the manner similar to that described with respect to FIG. 3, the training video sequence 504 (e.g., the constituent shots of the training video sequence 504) are passed through a pre-trained inflated 3D neural network to predict 1024-dimensional latent feature vectors. In one or more embodiments, the training video sequence 504 is passed through an inflated 3D RGB network (e.g., inflated 3D RGB network 302) to produce an inflated 3D RGB feature vector, $i_{RGB}$, based on the RGB content per frame of the training video sequence 504. The training video sequence 504 is also passed through an inflated 3D optical flow network (e.g., inflated 3D optical flow network 304) to produce an inflated 3D optical flow feature vector, $i_{flow}$, based on the optical flow between consecutive pairs of frames. The inflated 3D RGB feature vector and the inflated 3D optical flow feature vector are then concatenated to create concatenated feature vectors. The concatenated feature vectors is then passed through an editing parameters prediction network 116, as described with respect to FIG. 4, to generate editing operations parameter values 508, which can include predicted mean edit parameters and standard deviation edit parameters for each of one or more editing operations across all of the frames in a shot in training video sequence 504. The predicted mean edit parameters and the predicted standard deviation edit parameters are across all the frames in each shot, and can be expressed as follows:

$$\mu^{pred} = (\mu_{be}^{pred}, \mu_{cl}^{pred}, \mu_{cn}^{pred}, \mu_{lm}^{pred}, \mu_{tm}^{pred})$$

$$\sigma^{pred} = (\sigma_{be}^{pred}, \sigma_{cl}^{pred}, \sigma_{cn}^{pred}, \sigma_{lm}^{pred}, \sigma_{tm}^{pred})$$

After generating the editing operations parameter values 508, the video analyzing module 114 sends the editing operations parameter values 508 to a loss function 510. The loss function also receives the ground truth parameter values 506, at numeral 6. The loss function 510 can compute the loss between the predicted editing operations parameter values 508 and the ground truth parameter values 506, as shown at numeral 7.

In one or more embodiments, the loss can be computed using a Kullback-Leibler divergence (KLD) loss, as follows:

$$KLD = \frac{1}{2} \sum_{k \in \{be,cl,cn,lm,tm\}} \left| 2\log \frac{\sigma_k^{calc}}{\sigma_k^{pred}} - 1 + \frac{(\sigma_k^{pred})^2}{(\sigma_k^{calc})^2} + \frac{(\mu_k^{calc} - \mu_k^{pred})^2}{(\sigma_k^{calc})^2} \right|$$

The calculated loss can then be backpropagated to the editing parameters prediction network 116 and used to train the neural network, as shown at numeral 8.

In one or more embodiments, to ensure that the editing parameters prediction network 116 does not simply predict the calculated edit values in the shots (e.g., "memorize" the data), a data augmentation process can be performed on the training video sequence 504. For example, one or more of the edit parameters of the input shots of the training video sequence 504 can be randomly altered (e.g., increasing image brightness to make the video sequence look overexposed), while providing the edit values from the original shots as the ground truth parameter values. This training paradigm ensures that the network learns to map the shots to the ground-truth edit parameter values, which can be different from the values computed from the altered shots.

Figure 6:
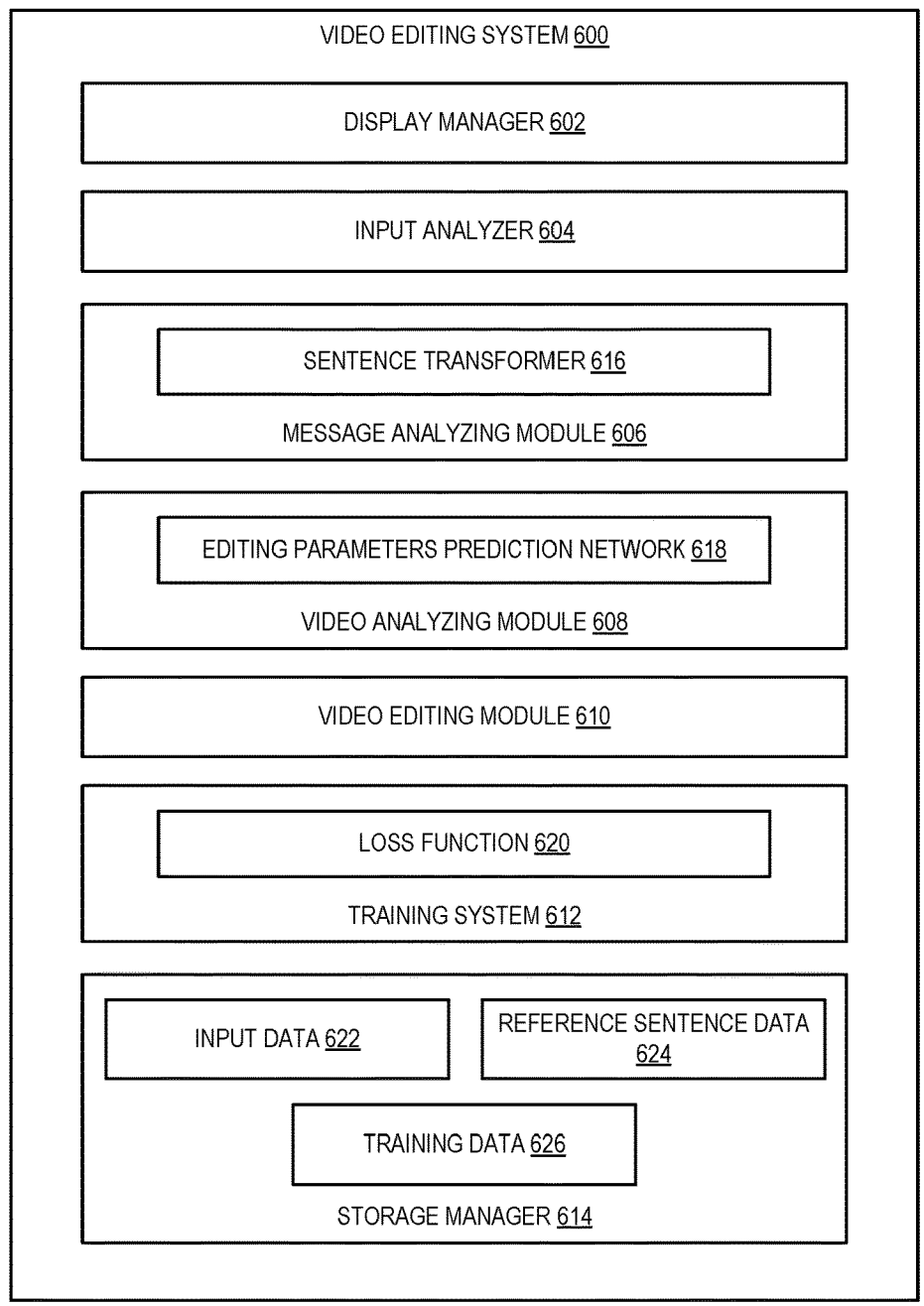
FIG. 6 illustrates a schematic diagram of a video editing system in accordance with one or more embodiments.

FIG. 6 illustrates a schematic diagram of a video editing system (e.g., "video editing system" described above) in accordance with one or more embodiments. As shown, the video editing system 600 may include, but is not limited to, a display manager 602, an input analyzer 604, a message analyzing module 606, a video analyzing module 608, a video editing module 610, a training system 612, and a storage manager 614. As shown, the message analyzing module 606 includes transformer 616, video analyzing module 608 includes an editing parameters prediction network 618, and the training system 612 includes loss function 620. The storage manager 614 includes input data 622, reference sentence data 624, and training data 626.

As illustrated in FIG. 6, the video editing system 600 includes a display manager 602. In one or more embodiments, the display manager 602 identifies, provides, manages, and/or controls a user interface provided on a touch screen or other device. Examples of displays include interactive whiteboards, graphical user interfaces (or simply "user interfaces") that allow a user to view and interact with content items, or other items capable of display on a touch screen. For example, the display manager 602 may identify, display, update, or otherwise provide various user interfaces that include one or more display elements in various layouts. In one or more embodiments, the display manager 602 can identify a display provided on a touch screen or other types of displays (e.g., including monitors, projectors, headsets, etc.) that may be interacted with using a variety of input devices. For example, a display may include a graphical user interface including one or more display elements capable of being interacted with via one or more touch gestures or other types of user inputs (e.g., using a stylus, a mouse, or other input devices). Display elements include, but are not limited to buttons, text boxes, menus, thumbnails, scroll bars, hyperlinks, etc.

As further illustrated in FIG. 6, the video editing system 600 also includes an input analyzer 604. The input analyzer 604 analyzes an input received by the video editing system 600 to identify video sequences and messages (e.g., conversational messages of users regarding the video sequences).

As further illustrated in FIG. 6, the video editing system 600 also includes message analyzing module 606. In some embodiments, the message analyzing module 606 can includes a sentence transformer 616 configured to generate multi-dimensional latent feature vectors from sentences, including from input messages and reference sentences mapped to editing operations. In other embodiments, the sentence transformer 616 is configured to generate n-dimensional latent feature vectors of numerical features that represent the sentences input to the sentence transformer 616. In one or more embodiments, the sentence transformer 616 is a BERT-based sentence transformer. The sentence transformer 616 can be implemented as, or include, one or more machine learning models, such as a neural network or a deep learning model.

As further illustrated in FIG. 6, the video editing system 600 also video analyzing module 608 configured to predict parameter values for one or more editing operations using an editing parameters prediction network 618. The editing parameters prediction network 618 can be implemented as, or include, one or more machine learning models, such as a neural network or a deep learning model. During training, the editing parameters prediction network 618 can predict parameter values for some or all of a plurality of editing operations based on processing a training video sequence. During inference, the editing parameters prediction network 618 can predict parameter values for editing operations indicated as being candidate editing operations based on the output of the message analyzing module 110.

As further illustrated in FIG. 6, the video editing system 600 also includes a video editing module 610 configured to generate a modified video sequence by applying the predicted editing operations parameter values for the candidate editing operation to an input video sequence. In some embodiments, the video editing module 610 can automatically apply mean values of the predicted parameter values to the input video sequence to produce the modified video sequence.

As further illustrated in FIG. 6, the video editing system 600 includes training system 612 which is configured to teach, guide, tune, and/or train one or more neural networks. In particular, the training system 612 trains editing parameters prediction network 618, based on training data.

As further illustrated in FIG. 6, the storage manager 614 includes input data 622, reference sentence data 624, and training data 626. In particular, the input data 622 may include an input video sequences and messages corresponding to the input video sequences received by the video editing system 600. The reference sentence data 624 may include a plurality of reference sentences that are each mapped to one or more editing operations. The reference sentence data 624 can also include reference sentence feature vectors generated by the message analyzing module 606 that can be used to calculate the similarity of reference sentences to the input messages. In one or more embodiments, the training data 626 may include video sequences that can be used during a training process of the video editing system 600 to editing parameters prediction network 618.

Each of the components 602-614 of the video editing system 600 and their corresponding elements (as shown in FIG. 6) may be in communication with one another using any suitable communication technologies. It will be recognized that although components 602-614 and their corresponding elements are shown to be separate in FIG. 6, any of components 602-614 and their corresponding elements may be combined into fewer components, such as into a single facility or module, divided into more components, or configured into different components as may serve a particular embodiment.

The components 602-614 and their corresponding elements can comprise software, hardware, or both. For example, the components 602-614 and their corresponding elements can comprise one or more instructions stored on a computer-readable storage medium and executable by processors of one or more computing devices. When executed by the one or more processors, the computer-executable instructions of the video editing system 600 can cause a client device and/or a server device to perform the methods described herein. Alternatively, the components 602-614 and their corresponding elements can comprise hardware, such as a special purpose processing device to perform a certain function or group of functions. Additionally, the components 602-614 and their corresponding elements can comprise a combination of computer-executable instructions and hardware.

Furthermore, the components 602-614 of the video editing system 600 may, for example, be implemented as one or more stand-alone applications, as one or more modules of an application, as one or more plug-ins, as one or more library functions or functions that may be called by other applications, and/or as a cloud-computing model. Thus, the components 602-614 of the video editing system 600 may be implemented as a stand-alone application, such as a desktop or mobile application. Furthermore, the components 602-614 of the video editing system 600 may be implemented as one or more web-based applications hosted on a remote server. Alternatively, or additionally, the components of the video editing system 600 may be implemented in a suit of mobile device applications or "apps."

Figure 7:
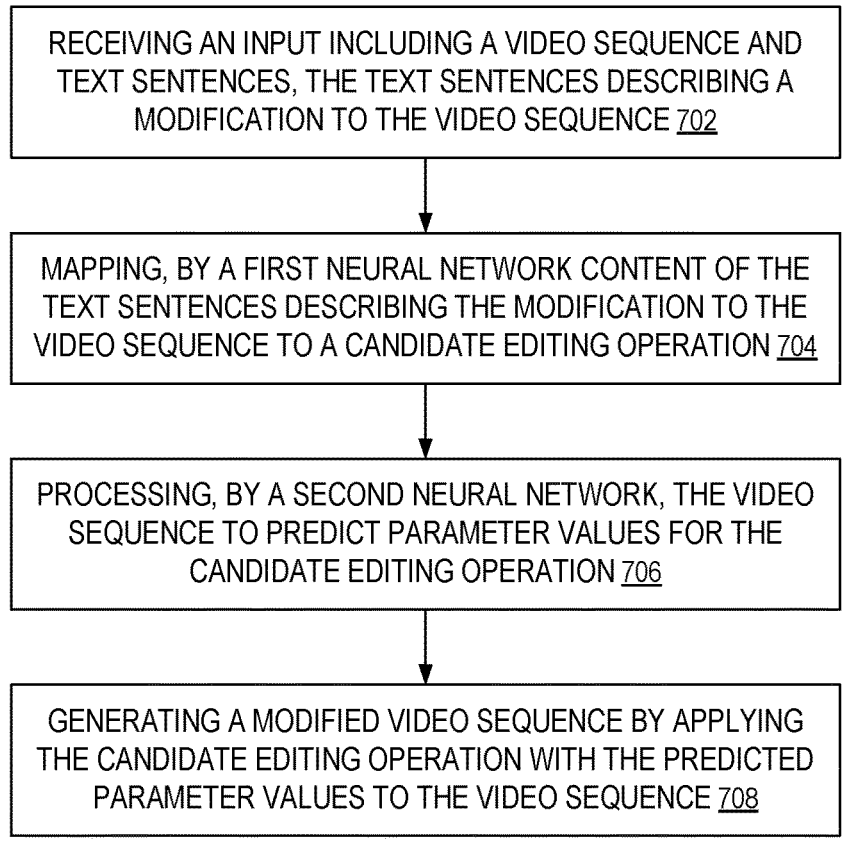
FIG. 7 illustrates a flowchart of a series of acts in a method of predicting parameter values for editing operations for application to a video sequence based on processing conversational messages by a video editing system in accordance with one or more embodiments.

FIGS. 1-6, the corresponding text, and the examples, provide a number of different systems and devices that allow a video editing system to predict parameters for editing operations for application to a video sequence based on semantic understanding of messages corresponding to the video sequence. In addition to the foregoing, embodiments can also be described in terms of flowcharts comprising acts and steps in a method for accomplishing a particular result. For example, FIG. 7 illustrates a flowchart of an exemplary method in accordance with one or more embodiments. The method described in relation to FIG. 7 may be performed with less or more steps/acts or the steps/acts may be performed in differing orders. Additionally, the steps/acts described herein may be repeated or performed in parallel with one another or in parallel with different instances of the same or similar steps/acts.

FIG. 7 illustrates a flowchart of a series of acts in a method of predicting parameter values for editing operations for application to a video sequence based on processing conversational messages by a video editing system in accordance with one or more embodiments. In one or more embodiments, the method 700 is performed in a digital medium environment that includes the video editing system 600. The method 700 is intended to be illustrative of one or more methods in accordance with the present disclosure and is not intended to limit potential embodiments. Alternative embodiments can include additional, fewer, or different steps than those articulated in FIG. 7.

As shown in FIG. 7, the method 700 includes an act 702 of receiving an input including a video sequence and text sentences, the text sentences describing a modification to the video sequence. In one or more embodiments, the video editing system receives the input from a user (e.g., via a computing device). In one or more embodiments, the user may select the video sequence in an application, or the user may submit the video sequence to a web service or an application configured to receive inputs. The video sequence can also be a portion selected from a longer video sequence. For example, after providing the video sequence to the application, the application can provide an interface to enable the user to select a portion of the longer video sequence. In one or more embodiments, the text sentences can be from users interacting with the video editing system or from a messaging platform (e.g., application) external from the video editing system and provided to the video editing system.

As shown in FIG. 7, the method 700 also includes an act 704 of mapping, by a first neural network, content of the text sentences describing the modification to the video sequence to a candidate editing operation. In one or more embodiments, a message analyzing module maps the content of the text sentences to a reference sentence, where each reference sentence of a plurality of reference sentences is associated with an editing operation. Editing operations can include changing brightness, contrast, blurriness, colorfulness, and temperature, as well as trimming the length, of the video sequence. In one or more embodiments, the message analyzing module maps the content of the text sentences to a reference sentence by generating, using a sentence transformer, sentence features for the text messages and reference sentence features for one or more reference sentences. In one or more embodiments, the sentence features and reference sentence features are expressed as multi-dimensional latent feature vectors. The message analyzing module then calculates cosine similarity values between the sentence features for the text sentences and reference sentence features for each of the reference sentences. The message analyzing module then identified the reference sentence having the highest calculated cosine similarity with the sentence features for the text sentences as the candidate editing operation. In some embodiments, where there are multiple sentences mapped to multiple reference sentences, the message analyzing module can identify a plurality of candidate editing operations.

As shown in FIG. 7, the method 700 also includes an act 706 of processing, by a second neural network, the video sequence to predict parameter values for the candidate editing operation. In one or more embodiments, a video analyzing module predicts parameter values for the candidate editing operation using the video sequence and the candidate editing operations determined by the message analyzing module, a video analyzing module. In one or more embodiments, for each frame of the video sequence, the video analyzing module generates an RGB feature vector and an optical flow feature vector (e.g., using an inflated 3D RGB network and inflated 3D optical flow network, respectively). The RGB feature vector and the optical flow feature vector are concatenated and then passed through an editing parameters prediction network to predict the parameter values for the candidate editing operation.

In one or more embodiments, the editing parameters prediction network includes a series of five one-dimensional convolutional neural networks (CNNs), each followed by a batch normalization. Following the final batch normalization, the concatenated feature vectors are passed through three fully-connected layers. The output of the three fully-connected layers is passed to two final fully-connected layers. In one or more embodiments, the predicted parameter values for the candidate editing operation include mean parameter values and standard deviation parameter values, each generated by one of the two final fully-connected layers.

As shown in FIG. 7, the method 700 also includes an act 708 of generating a modified video sequence by applying the candidate editing operation with the predicted parameter values to the video sequence. In one or more embodiments, the video editing module generates a modified video sequence by applying the predicted editing operations parameter values for the candidate editing operation to the video sequence. For example, the video editing module adjusts a brightness parameter in response to mapping the text sentences to a brightness editing operation. Similarly, the video editing module adjusts a contrast parameter in response to mapping the text sentences to a contrast editing operation.

In some embodiments, the video editing module can automatically apply the mean value(s) to the video sequence to produce the modified video sequence. In other embodiments, the video editing module generates a graphical user interface indicating the candidate editing operation and a range of values based on the predicted editing operations parameter values for the candidate editing operation. The graphical user interface can include an interface element (e.g., an adjustable dial) that allows a user to adjust the parameters for the candidate editing operation.

In some embodiments, where the candidate editing operation is to trim a portion of the video sequence (e.g., the messages include a statement such as, "Let's trim the last two seconds."), the video analyzing module performs a video sequence highlight identification process to identify the highlighted portions of the video sequence. In such embodiments, the video analyzing module can determine whether any highlighted portions are within the amount of trim identified in the messages. In one or more embodiments, the duration of the trim can be modified (e.g., shortened or lengthened) based on whether any highlighted portions intersect the amount of trim identified in the messages. The highlighted portions are determined by tracking the presence and movements of humans and objects of interest in the video. For example, if the amount of trim identified in the messages is the last two seconds at the end of the video sequence and the detected highlighted portion is that of a person making a sandwich, which extends 0.2 seconds beyond the last two seconds of the video sequence, the video analyzing module may provide an output indicating an edit of the last 1.8 seconds at the end of the video sequence to contain the entire highlighted portion. In another embodiment, using the shot detection process described with respect to the input analyzer in FIG. 1, the constituent shots of the video sequence, including the location of shot boundaries, can be determined. Using the location of shot boundaries, the duration of the trim can be modified (e.g., shortened or lengthened) based on whether any shot boundaries intersect the amount of trim identified in the messages. For example, if the amount of trim identified in the messages is the last two seconds at the end of the video sequence and an end time for a shot boundary extends 0.5 seconds into the last two seconds at the end of the video sequence the video analyzing module may provide an output indicating an edit of the last 1.5 seconds at the end of the video sequence.

In some embodiments, the process of predicting the editing operations parameters values can operate independently of whether conversational messages are received by the video editing system. In such embodiments, given only a video sequence without any corresponding conversational messages (or without any conversational messages indicating any candidate editing operations), the editing parameters prediction network can predict editing operations parameters values based on analyzing the video sequence. The video editing system can then present the predicted editing operations parameter values.

Figure 8:
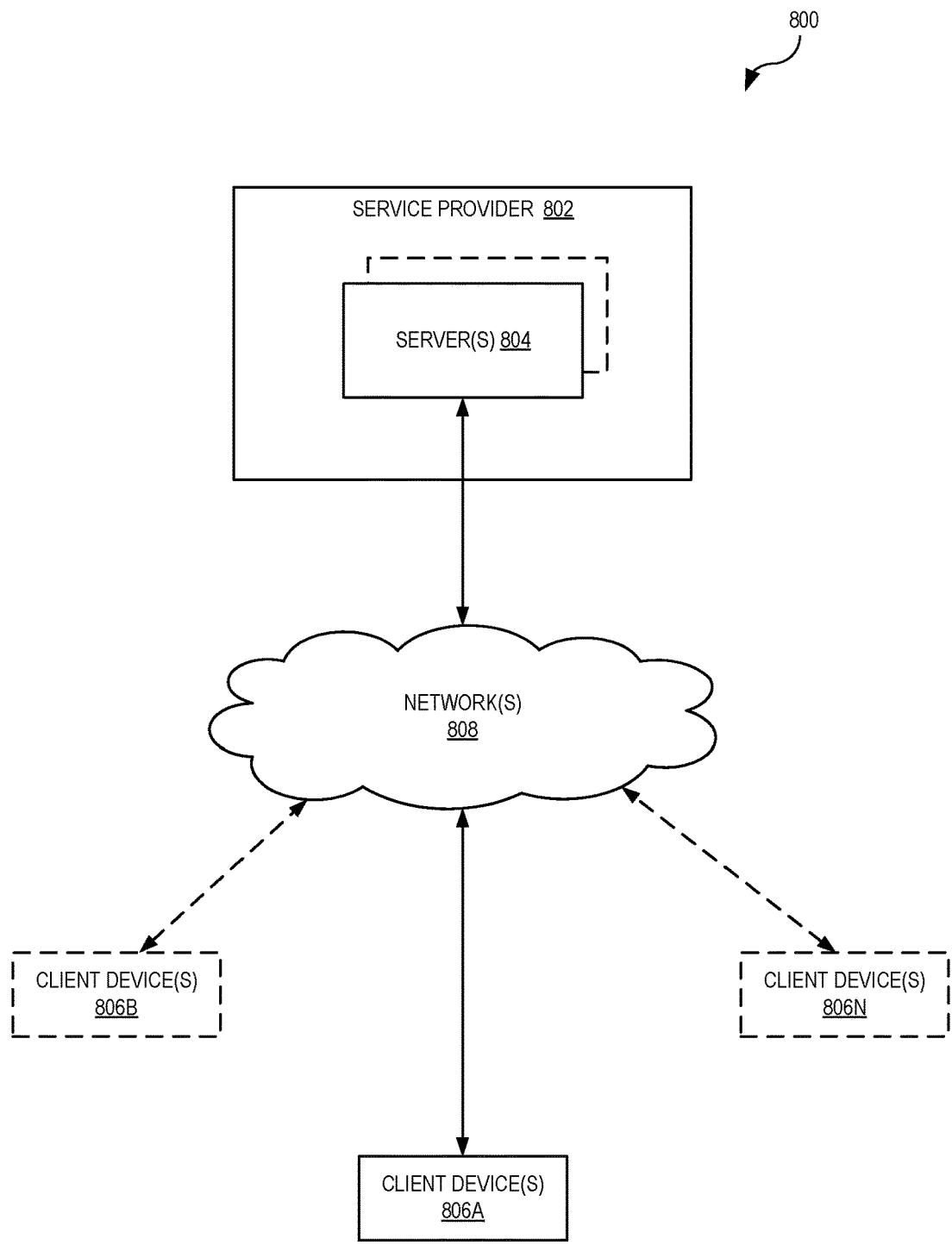
FIG. 8 illustrates a schematic diagram of an exemplary environment in which the video editing system can operate in accordance with one or more embodiments.

FIG. 8 illustrates a schematic diagram of an exemplary environment 800 in which the video editing system 600 can operate in accordance with one or more embodiments. In one or more embodiments, the environment 800 includes a service provider 802 which may include one or more servers 804 connected to a plurality of client devices 806A-806N via one or more networks 808. The client devices 806A-806N, the one or more networks 808, the service provider 802, and the one or more servers 804 may communicate with each other or other components using any communication platforms and technologies suitable for transporting data and/or communication signals, including any known communication technologies, devices, media, and protocols supportive of remote data communications, examples of which will be described in more detail below with respect to FIG. 9.

Although FIG. 8 illustrates a particular arrangement of the client devices 806A-806N, the one or more networks 808, the service provider 802, and the one or more servers 804, various additional arrangements are possible. For example, the client devices 806A-806N may directly communicate with the one or more servers 804, bypassing the network 808. Or alternatively, the client devices 806A-806N may directly communicate with each other. The service provider 802 may be a public cloud service provider which owns and operates their own infrastructure in one or more data centers and provides this infrastructure to customers and end users on demand to host applications on the one or more servers 804. The servers may include one or more hardware servers (e.g., hosts), each with its own computing resources (e.g., processors, memory, disk space, networking bandwidth, etc.) which may be securely divided between multiple customers, each of which may host their own applications on the one or more servers 804. In some embodiments, the service provider may be a private cloud provider which maintains cloud infrastructure for a single organization. The one or more servers 804 may similarly include one or more hardware servers, each with its own computing resources, which are divided among applications hosted by the one or more servers for use by members of the organization or their customers.

Similarly, although the environment 800 of FIG. 8 is depicted as having various components, the environment 800 may have additional or alternative components. For example, the environment 800 can be implemented on a single computing device with the video editing system 600. In particular, the video editing system 600 may be implemented in whole or in part on the client device 806A. Alternatively, in some embodiments, the environment 800 is implemented in a distributed architecture across multiple computing devices.

As illustrated in FIG. 8, the environment 800 may include client devices 806A-806N. The client devices 806A-806N may comprise any computing device. For example, client devices 806A-806N may comprise one or more personal computers, laptop computers, mobile devices, mobile phones, tablets, special purpose computers, TVs, or other computing devices, including computing devices described below with regard to FIG. 9. Although three client devices are shown in FIG. 8, it will be appreciated that client devices 806A-806N may comprise any number of client devices (greater or smaller than shown).

Moreover, as illustrated in FIG. 8, the client devices 806A-806N and the one or more servers 804 may communicate via one or more networks 808. The one or more networks 808 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 808 may be any suitable network over which the client devices 806A-806N may access the service provider 802 and server 804, or vice versa. The one or more networks 808 will be discussed in more detail below with regard to FIG. 9.

In addition, the environment 800 may also include one or more servers 804. The one or more servers 804 may generate, store, receive, and transmit any type of data, including input data 622, reference sentence data 624, and training data 626 or other information. For example, a server 804 may receive data from a client device, such as the client device 806A, and send the data to another client device, such as the client device 806B and/or 806N. The server 804 can also transmit electronic messages between one or more users of the environment 800. In one example embodiment, the server 804 is a data server. The server 804 can also comprise a communication server or a web-hosting server. Additional details regarding the server 804 will be discussed below with respect to FIG. 9.

As mentioned, in one or more embodiments, the one or more servers 804 can include or implement at least a portion of the video editing system 600. In particular, the video editing system 600 can comprise an application running on the one or more servers 804 or a portion of the video editing system 600 can be downloaded from the one or more servers 804. For example, the video editing system 600 can include a web hosting application that allows the client devices 806A-806N to interact with content hosted at the one or more servers 804. To illustrate, in one or more embodiments of the environment 800, one or more client devices 806A-806N can access a webpage supported by the one or more servers 804. In particular, the client device 806A can run a web application (e.g., a web browser) to allow a user to access, view, and/or interact with a webpage or website hosted at the one or more servers 804.

Upon the client device 806A accessing a webpage or other web application hosted at the one or more servers 804, in one or more embodiments, the one or more servers 804 can provide a user of the client device 806A with an interface to provide inputs, including a video sequence and messages describing modifications to the video sequence. Upon receiving the video sequence and messages, the one or more servers 804 can automatically perform the methods and processes described above to predict parameters for editing operations for application to the video sequence based on a semantic understanding of the messages and a content understanding of the video sequence.

As just described, the video editing system 600 may be implemented in whole, or in part, by the individual elements 802-808 of the environment 800. It will be appreciated that although certain components of the video editing system 600 are described in the previous examples with regard to particular elements of the environment 800, various alternative implementations are possible. For instance, in one or more embodiments, the video editing system 600 is implemented on any of the client devices 806A-806N. Similarly, in one or more embodiments, the video editing system 600 may be implemented on the one or more servers 804. Moreover, different components and functions of the video editing system 600 may be implemented separately among client devices 806A-806N, the one or more servers 804, and the network 808.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
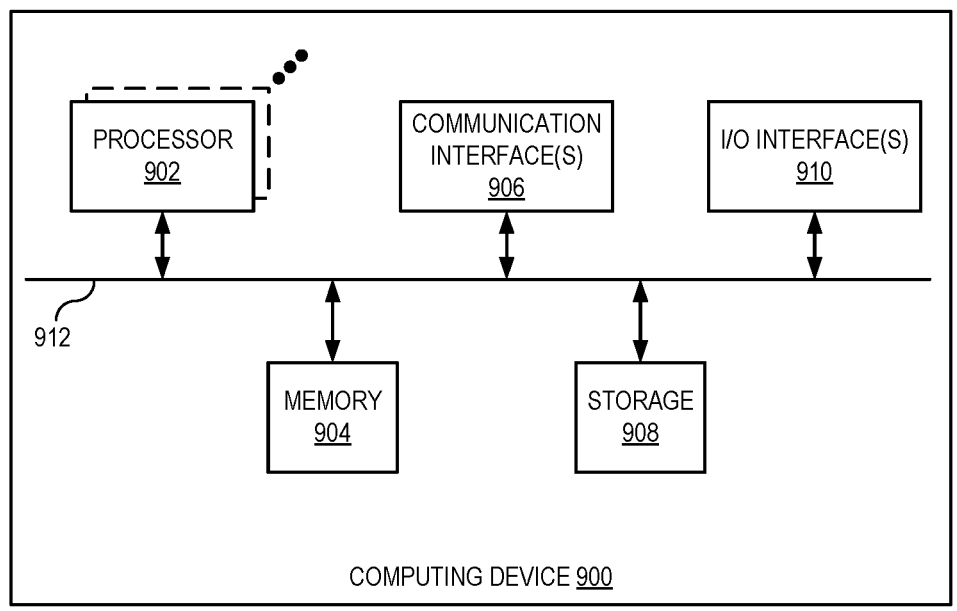
FIG. 9 illustrates a block diagram of an exemplary computing device in accordance with one or more embodiments.

FIG. 9 illustrates, in block diagram form, an exemplary computing device 900 that may be configured to perform one or more of the processes described above. One will appreciate that one or more computing devices such as the computing device 900 may implement the video editing system 600. As shown by FIG. 9, the computing device can comprise a processor 902, memory 904, one or more communication interfaces 906, a storage device 908, and one or more input or output ("I/O") devices/interfaces 910. In certain embodiments, the computing device 900 can include fewer or more components than those shown in FIG. 9. Components of computing device 900 shown in FIG. 9 will now be described in additional detail.

In particular embodiments, processor(s) 902 includes hardware for executing instructions, such as those making up a computer program. As an example, and not by way of limitation, to execute instructions, processor(s) 902 may retrieve (or fetch) the instructions from an internal register, an internal cache, memory 904, or a storage device 908 and decode and execute them. In various embodiments, the processor(s) 902 may include one or more central processing units (CPUs), graphics processing units (GPUs), field programmable gate arrays (FPGAs), systems on chip (SoC), or other processor(s) or combinations of processors.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 904 may be internal or distributed memory.

The computing device 900 can further include one or more communication interfaces 906. A communication interface 906 can include hardware, software, or both. The communication interface 906 can provide one or more interfaces for communication (such as, for example, packet-based communication) between the computing device and one or more other computing devices 900 or one or more networks. As an example, and not by way of limitation, communication interface 906 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can comprise hardware, software, or both that couples components of computing device 900 to each other.

The computing device 900 includes a storage device 908 includes storage for storing data or instructions. As an example, and not by way of limitation, storage device 908 can comprise a non-transitory storage medium described above. The storage device 908 may include a hard disk drive (HDD), flash memory, a Universal Serial Bus (USB) drive or a combination these or other storage devices. The computing device 900 also includes one or more I/O devices/interfaces 910, which are provided to allow a user to provide input to (such as user strokes), receive output from, and otherwise transfer data to and from the computing device 900. These I/O devices/interfaces 910 may include a mouse, keypad or a keyboard, a touch screen, camera, optical scanner, network interface, modem, other known I/O devices or a combination of such I/O devices/interfaces 910. The touch screen may be activated with a stylus or a finger.

The I/O devices/interfaces 910 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 910 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A computer-implemented method comprising:
    receiving an input including a video sequence and text sentences, the text sentences describing a modification to the video sequence;
    mapping, by a first neural network, content of the text sentences describing the modification to the video sequence to a candidate video editing operation;
    processing, by a second neural network, the video sequence to predict parameter values for the candidate video editing operation; and
    generating a modified video sequence by applying the candidate video editing operation with the predicted parameter values to the video sequence.

2. The computer-implemented method of claim 1, wherein mapping the content of the text sentences describing the modification to the video sequence to the candidate video editing operation comprises:
    mapping the content of the text sentences to a reference sentence; and
    identifying a video editing operation associated with the reference sentence as the candidate video editing operation.

3. The computer-implemented method of claim 2, wherein mapping the content of the text sentences to the reference sentence comprises:
    generating, by a sentence transformer, sentence features for the text sentences;
    calculating cosine similarity values between the sentence features for the text sentences and reference sentence features for reference sentences, wherein each reference sentence of the reference sentences is associated with a video editing operation; and identifying the reference sentence having a highest calculated cosine similarity with the sentence features for the text sentences.

4. The computer-implemented method of claim 1, wherein processing the video sequence to predict the parameter values for the candidate video editing operation comprises:

for each frame of the video sequence:
generating an RGB feature vector and an optical flow feature vector,
concatenating the RGB feature vector and the optical flow feature vector to create a concatenated feature vector, and
passing the concatenated feature vector through an editing parameters prediction network to predict the parameter values for the candidate video editing operation.

5. The computer-implemented method of claim 4, wherein the predicted parameter values for the candidate video editing operation include mean parameter values and standard deviation parameter values.

6. The computer-implemented method of claim 1, further comprising:

receiving a second input including second text sentences, the second text sentences describing a second modification to trim the video sequence by a first amount of time;
detecting shot boundaries within the video sequence;
determining that an end time of a shot boundary is within the first amount of time; and
trimming a second amount of time from the video sequence starting at the end time of the shot boundary, wherein the second amount of time is different from the first amount of time.

7. The computer-implemented method of claim 1, wherein generating the modified video sequence by applying the candidate video editing operation with the predicted parameter values for the candidate video editing operation to the video sequence comprises:

adjusting a brightness parameter in response to mapping the text sentences to a brightness editing operation.

8. The computer-implemented method of claim 1, further comprising:

receiving a second input including a second video sequence;
processing, by the second neural network, the second video sequence to predict parameter values for one or more video editing operations; and
generating a modified second video sequence by applying the one or more video editing operations with the predicted parameter values to the second video sequence.

9. A non-transitory computer-readable storage medium storing executable instructions, which when executed by a processing device, cause the processing device to perform operations comprising:

receiving an input including a video sequence and text sentences, the text sentences describing a modification to the video sequence;
mapping, by a first neural network, content of the text sentences describing the modification to the video sequence to a candidate video editing operation;
processing, by a second neural network, the video sequence to predict parameter values for the candidate video editing operation; and
generating a modified video sequence by applying the candidate video editing operation with the predicted parameter values to the video sequence.

10. The non-transitory computer-readable storage medium of claim 9, wherein to map the content of the text sentences describing the modification to the video sequence to the candidate video editing operation the instructions further cause the processing device to perform operations comprising:

mapping the content of the text sentences to a reference sentence; and
identifying a video editing operation associated with the reference sentence as the candidate video editing operation.

11. The non-transitory computer-readable storage medium of claim 10, wherein to map the content of the text sentences to the reference sentence the instructions further cause the processing device to perform operations comprising:

generating, by a sentence transformer, sentence features for the text sentences;
calculating cosine similarity values between the sentence features for the text sentences and reference sentence features for reference sentences, wherein each reference sentence of the reference sentences is associated with a video editing operation; and
identifying the reference sentence having a highest calculated cosine similarity with the sentence features for the text sentences.

12. The non-transitory computer-readable storage medium of claim 9, wherein to process the video sequence to predict the parameter values for the candidate video editing operation the instructions further cause the processing device to perform operations comprising:

for each frame of the video sequence:
generating an RGB feature vector and an optical flow feature vector,
concatenating the RGB feature vector and the optical flow feature vector to create a concatenated feature vector, and
passing the concatenated feature vector through an editing parameters prediction network to predict the parameter values for the candidate video editing operation.

13. The non-transitory computer-readable storage medium of claim 12, wherein the predicted parameter values for the candidate video editing operation include mean parameter values and standard deviation parameter values.

14. The non-transitory computer-readable storage medium of claim 9, wherein the instructions further cause the processing device to perform operations comprising:

receiving a second input including second text sentences, the second text sentences describing a second modification to trim the video sequence by a first amount of time;
detecting shot boundaries within the video sequence;
determining that an end time of a shot boundary is within the first amount of time; and
trimming a second amount of time from the video sequence starting at the end time of the shot boundary, wherein the second amount of time is different from the first amount of time.

15. The non-transitory computer-readable storage medium of claim 9, wherein to generate the modified video sequence by applying the candidate video editing operation with the predicted parameter values for the candidate video editing operation to the video sequence the instructions further cause the processing device to perform operations comprising:

adjusting a brightness parameter in response to mapping the text sentences to a brightness editing operation.

16. The non-transitory computer-readable storage medium of claim 9, wherein the instructions further cause the processing device to perform operations comprising:

receiving a second input including a second video sequence;

processing, by the second neural network, the second video sequence to predict parameter values for one or more video editing operations; and generating a modified second video sequence by applying the one or more video editing operations with the predicted parameter values to the second video sequence.

17. A system comprising:
a memory component; and
a processing device coupled to the memory component, the processing device to perform operations comprising:

receiving an input including a video sequence and text sentences, the text sentences describing a modification to the video sequence;

mapping, by a first neural network, content of the text sentences describing the modification to the video sequence to a candidate video editing operation;

processing, by a second neural network, the video sequence to predict parameter values for the candidate video editing operation; and generating a modified video sequence by applying the candidate video editing operation with the predicted parameter values to the video sequence.

18. The system of claim 17, wherein to map the content of the text sentences describing the modification to the video sequence to the candidate video editing operation the processing device further performs operations comprising:

mapping the content of the text sentences to a reference sentence; and identifying a video editing operation associated with the reference sentence as the candidate video editing operation.

19. The system of claim 18, wherein to map the content of the text sentences to the reference sentence the processing device further performs operations comprising:

generating, by a sentence transformer, sentence features for the text sentences;

calculating cosine similarity values between the sentence features for the text sentences and reference sentence features for reference sentences, wherein each reference sentence of the reference sentences is associated with a video editing operation; and identifying the reference sentence having a highest calculated cosine similarity with the sentence features for the text sentences.

20. The system of claim 17, wherein to process the video sequence to predict the parameter values for the candidate video editing operation the processing device further performs operations comprising:

for each frame of the video sequence:

generating an RGB feature vector and an optical flow feature vector, concatenating the RGB feature vector and the optical flow feature vector to create a concatenated feature vector, and passing the concatenated feature vector through an editing parameters prediction network to predict the parameter values for the candidate video editing operation.

* * * * *